United States Patent [19]

Hasegawa

[11] 4,258,992
[45] Mar. 31, 1981

[54] AUTOMATIC CONTROL DEVICE FOR A CAMERA HAVING AN ELECTROMAGNETIC RELEASE DEVICE

[75] Inventor: Hiroshi Hasegawa, Tokyo, Japan

[73] Assignee: Nippon Kogaku K.K., Tokyo, Japan

[21] Appl. No.: 961,768

[22] Filed: Nov. 17, 1978

[30] Foreign Application Priority Data

Nov. 18, 1977 [JP] Japan .................................. 52-137790

[51] Int. Cl.$^3$ .............................................. G03B 7/089
[52] U.S. Cl. .................................... 354/51; 354/60 R
[58] Field of Search ................. 354/23 D, 50, 51, 234, 354/235

[56] References Cited

U.S. PATENT DOCUMENTS

| 3,678,822 | 7/1972 | Veda et al. | 354/51 |
| 3,682,058 | 8/1972 | Wada | 354/51 |
| 4,015,198 | 3/1977 | Iwashita et al. | 354/234 |

Primary Examiner—L. T. Hix
Assistant Examiner—W. J. Brady
Attorney, Agent, or Firm—Fitzpatrick, Cella, Harper & Scinto

[57] ABSTRACT

An automatic exposure control device for a camera in which manual operation such as depression of a shutter button, causes memorization of an electric quantity in an analog memory element in accordance with a photoelectric output from a photometering circuit, and thereafter energization of an electromagnet release device which releases an exposure control mechanism from restraint.

5 Claims, 3 Drawing Figures

AUTOMATIC CONTROL DEVICE FOR A CAMERA HAVING AN ELECTROMAGNETIC RELEASE DEVICE

BACKGROUND OF THE INVENTION

1. Field of Invention

The present invention relates to an automatic exposure control device for a camera. More particularly, the invention relates to an automatic exposure control device for a camera provided with an electromagnetic release device for releasing an exposure control mechanism from restraint, the exposure control device being able to prevent deterioration of automatic exposure control performance which is due to decrease in the power source voltage caused by energizing an electromagnet of the electromagnetic release device.

2. Description of the Prior Art

There has so far been known a single lens reflex camera, for example, which has both an electromagnetic release device and an automatic exposure control device, as disclosed in U.S. Pat. No. 3,682,058. In such a camera, a common battery is generally used as a power source for both the devices.

The electromagnetic release device requires substantial power for energizing the electromagnet therein so that it is impossible to obviate a large decrease or drop in source voltage caused by internal resistance of the battery. The automatic exposure control device comprises a photometering circuit for producing a photoelectric output in response to the brightness of an object to be photographed, an analog memory element such as a capacitor which changes the amount of electric storage in response to the photoelectric output from the photometering circuit before energizing the electromagnet to release the exposure control mechanism and which memorizes the photoelectric output from the photometering circuit immediately before raising the mirror upon energization of the electromagnet, and a circuit for automatically controlling exposure in response to the photoelectric output stored in the analog memory element. The sequence of the operation of the aforementioned type of camera, therefore, is electromagnetic release (drop in power source voltage)—analog memory—automatic exposure control. It is noted here that the photoelectric output is memorized after the electromagnetic release. Therefore, the amount of storage in the analog memory element is varied depending on the drop in power source voltage caused by the energization of the electromagnet, and does not correspond to the photoelectric output. Before the storage amount of the analog memory element becomes correspondent to the photoelectric output, the mirror is raised so that exposure which is controlled based on the storage amount of the analog memory element, is not proper.

SUMMARY OF THE INVENTION

In view of the above-described disadvantage inherent in the known type of photographic camera, it is the primary object of the present invention to provide an automatic control device for a camera in which the causal relation between drop in the source voltage caused by the electromagnet energization of the electromagnetic release device and the amount of electric storage of the analog memory element is interrupted. In the automatic exposure control device of the invention, manual operation such as depression of the shutter button causes memorizing of an electric quantity in the analog memory element in accordance with the photoelectric output, and thereafter the electromagnet in the electromagnetic release device is energized.

It is a further object of the invention to provide an automatic exposure control device which attains the operational sequence as described in the above primary object even in the case of photography with use of a self-timer.

DETAILED DESCRIPTION OF THE PREFERRED EMBODIMENTS

Figure 1:
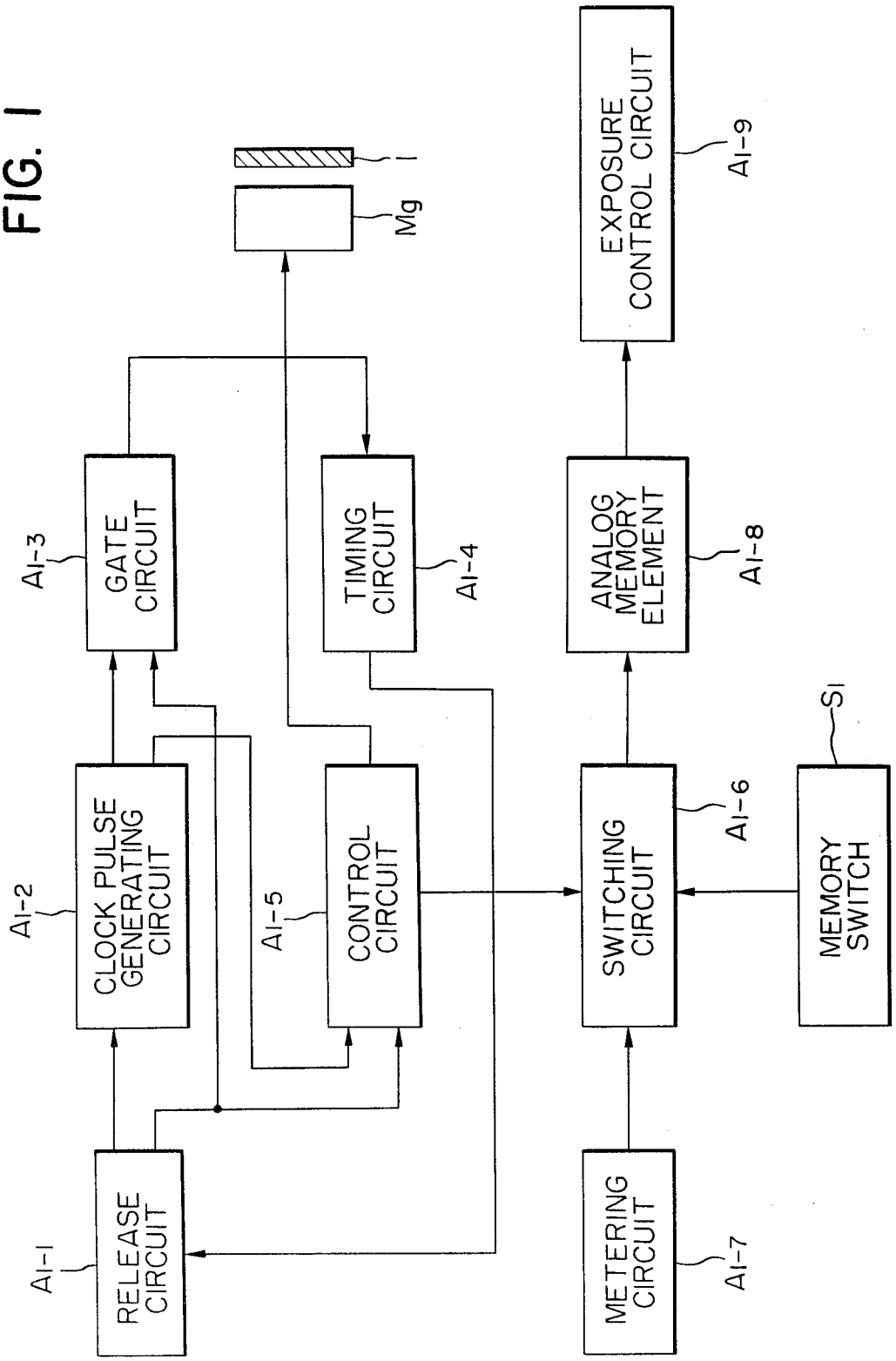
FIG. 1 is a block diagram showing a preferred embodiment of an automatic exposure control device for a camera according to the present invention.

In the following, the present invention will be described in detail referring to the accompanying drawing.

In the drawing, a release circuit A1-1 possesses two stable states. By detection of the manual operation, i.e., depression of the shutter button, it is brought to one of the stable states, i.e., a set condition. A clock pulse generating circuit A1-2 produces a clock pulse output of a definite cycle. A gate circuit A1-3 opens the gate when the release circuit A1-1 is in the set condition, and applies a clock pulse to a timing circuit A1-4. This timing circuit A1-4 counts a lapsed time after the manual operation, or more accurately, a lapsed time after the release circuit A1-1 has been brought to the set condition, by counting the clock pulse.

A control circuit A1-5 possesses two stable states. When the release circuit A1-1 is brought to a set condition, it assumes one of the two stable states, i.e., the first state. A memory switch S1 is interlocked with component members included in an aperture mechanism and a mirror mechanism, i.e., those members which move in one direction when they are released from engagement, and move in other direction when an exposure operation is completed to thereby return to their original positions. The switch is turned on at least prior to raising of the mirror, and is turned off after completion of the exposure. Incidentally, the memory switch S1 is also turned on after lapse of a certain definite time determined by mechanical conditions such as the aperture mechanism etc. following exposure completion.

A switching circuit A1-6 consisting of semiconductor elements such as transistors, FET's, and so on is turned off when the control circuit A1-5 assumes the first state to thereby interrupt the electrical connection between a metering circuit A1-7, which produces a photoelectric output in response to the brightness of the object to be photographed, and an analog memory element A1-8, such as a capacitor. As a result, the analog memory element A1-8 stores as a quantity of electricity the photoelectric output from the photometering circuit A1-7. On the other hand, the switching circuit A1-6 is turned on to connect the photometering circuit A1-7 and the analog memory element A1-8, when the memory switch S1 is turned off. In other words, the switching circuit A1-6 is maintained in on condition from the time in which the control circuit A1-5 assumes the first state to the time in which the memory switch S1 is turned off.

Thereafter, the control circuit A1-5 energizes an electromagnet Mg for electromagnetic release, that is, for electromagnetically actuating the automatic exposure control mechanisms. On account of this, an engagement member 1 is attracted to the electromagnet Mg to release an exposure control mechanism, that is, to release engagement with the aperture mechanism, the mirror mechanism, and so forth, whereby the stopping down and minor raising operations are effected. After completion of those operations, an exposure control circuit A1-19 automatically controls the shutter speed in response to the photoelectric output stored in the analog memory element A1-18.

On the other hand, the timing circuit A1-4 produces a timing output after it has counted predetermined numbers of clock pulse, i.e., after lapse of a time period from immediately after the time in which the memory switch S1 is turned on for completion of the exposure to immediately before the time in which the switch is turned off. The release circuit A1-1, when it has detected the timing output, is brought to the other stable state, i.e., a reset condition. As the result, the control circuit A1-5 is brought to the other stable state, i.e., the second state. As soon as the memory switch S1 is turned off, the analog switch A1-6 electrically connects the metering circuit A1-7 and the analog memory element A1-8 so that the analog memory element A1-8 is released from its memory state and changes its electric storage in response to the variation in the photoelectric output.

In such operational sequences, interruption of the photometering A1-7 from the analog memory element A1-8 by the switch A1-6, is under control of the control circuit A1-5 prior to power supply to the electromagnet member, which will be continued until, at least, the memory switch S1 is turned on, and when the memory switch S1 is turned on, the interruption is changed to be placed under control of the memory switch S1 from the control circuit A1-5. When the memory switch S1 is turned off, the photometering circuit A1-7 and the analog memory element A1-8 are connected.

Figure 2:
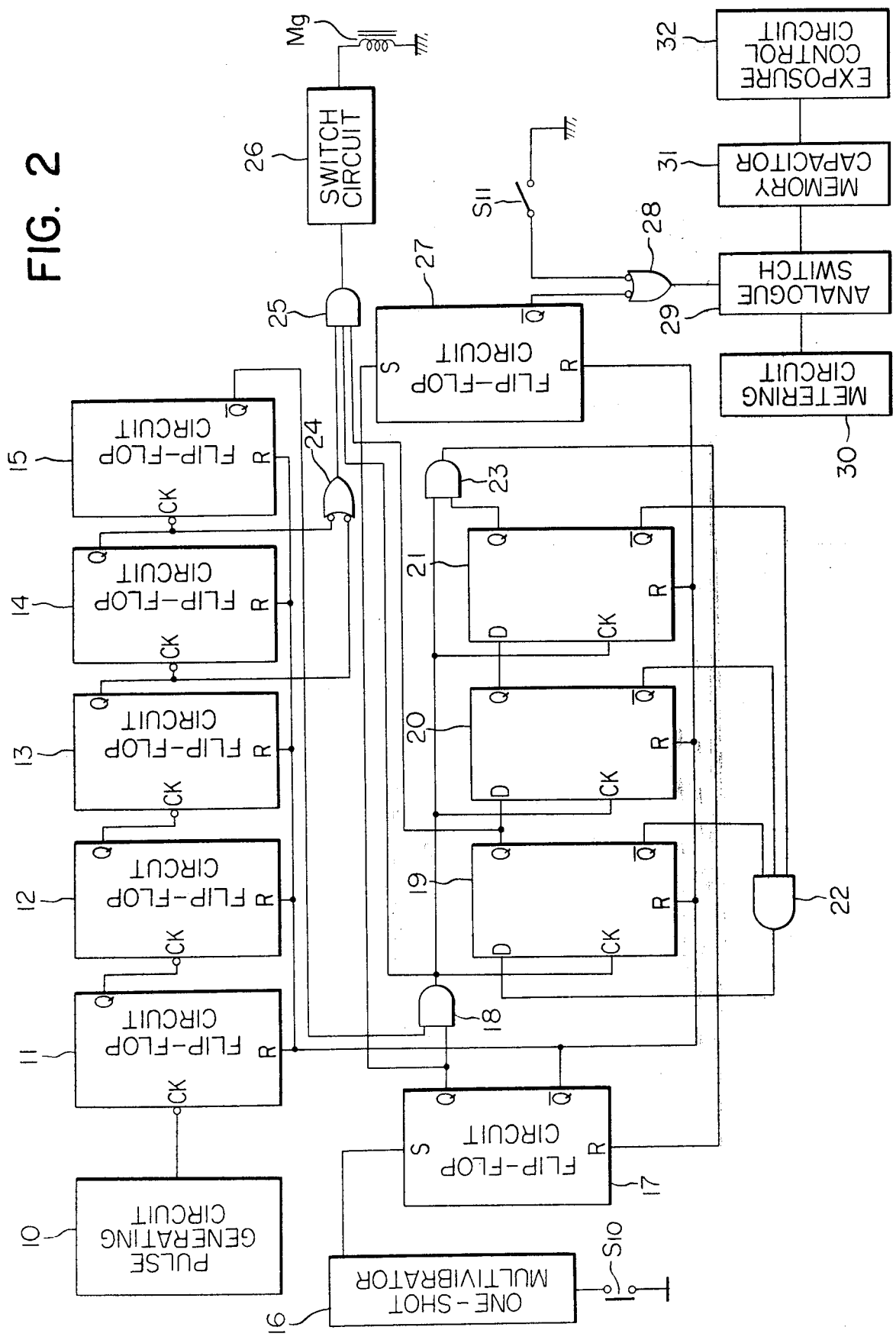
FIG. 2 is one embodiment of a circuit construction of an automatic exposure control device for a camera according to the present invention.

In FIG. 2, a pulse generating circuit 10 is shown which produces a pulse output of a certain definite cycle. Flip-flop circuits 11, 12, 13, 14 and 15 constitute frequency dividing circuits to divide the frequency of the output pulse from the pulse generating circuit 10 into predetermined numbers of states (in this embodiment, into five states), and an output $\overline{Q}$ of the flip-flop 15 is produced as the clock pulse output. The pulse generating circuit 10 and the flip-flop circuits 11 to 15 constitute a clock pulse generating circuit.

A switch S10 is associated with a shutter release button of a photographic camera, by depression (i.e., manual operation) of which it is turned on. A one-shot multi-vibrator 16 produces a pulse output of a certain definite time when the switch S10 is turned on. The pulse output from the one-shot multi-vibrator 16 is applied to an input S of a flip-flop 17. This flip-flop 17 also receives in its input terminal R an output from an "and" gate to be described later. The switch S10, the one-shot multi-vibrator 16, and the flip-flop 17 constitute a release circuit. An "and" gate 18 to be a "gate" circuit takes an output $\overline{Q}$ from the flip-flop 15 and an output Q from the flip-flop 17 as inputs thereto.

Flip-flops 19, 20, and 21 are supplied with the output from the "and" gate 18 into their respective input terminals CK. An output Q from the flip-flop 19 is applied to an input D of the flip-flop 20, and an output Q from the flip-flop 20 is applied to an input D of the flip-flop 21. Outputs $\overline{Q}$ from the flip-flops 19, 20, and 21 are introduced into an "and" gate 22 as the inputs thereto. An output from the "and" gate 22 is applied to an input D of the flip-flop 19. An "and" gate 23 takes an output from the "and" gate 18 and an output Q from the flip-flop 21 as inputs thereto, and applies its output to an input R of the flip-flop 17. The flip-flops 19, 20, 21, 22 and the "and" gates 22, 23 constitute a timing circuit.

An "or" gate 24 takes an output Q from the flip-flop 13 and output Q from the flip-flop 14 as the input thereto. An "and" gate 25 takes outputs from the "or" gate 24 and the "and" gate 18 and an output Q from the flip-flop 19 as inputs thereto. An output from the "and" gate 25 is applied to a switch circuit 26 which controls power supply to the electromagnet Mg.

An output Q from the flip-flop 17 is applied to an input S of a flip-flop 27 to be the control circuit.

One of two inputs of an "or" gate 28 is supplied with an output $\overline{Q}$ of the flip-flop 27, and the other input thereof is supplied with a ground voltage through a memory switch S11. An analog switch 29 is controlled by an output from the "or" gate 28.

An output $\overline{Q}$ from the flip-flop 17 is applied to the respective inputs R of the flip-flops 11 to 15, 19 to 21, and 27. In the drawing, a reference numeral 30 designates a photometering circuit, 31 a memory capacitor for memorizing the photoelectric output from photometering circuit 30, and 32 an exposure control circuit. Incidentally, a power source is omitted from illustration, since it is not particularly necessary to be shown.

In the following, operations of the circuit will be explained. When the switch S10 is turned on by manual operation, the one-shot multi-vibrator 16 applies a pulse at a level H to input S of the flip-flop 17, whereby an output Q from the flip-flop 17 assumes the level H, while an output $\overline{Q}$ assumes a level L. By this output $\overline{Q}$, the reset conditions of the flip-flops 11 to 15, 19 to 21, and 27 are released. At this instance, outputs Q from the flip-flops 11 to 14 are at the level L, while the output $\overline{Q}$ from the flip-flop 15 is at the level H. Accordingly, an output from the "or" gate 24 is at the level H. On the other hand, at the time or release of the reset condition, outputs Q from the flip-flops 19 to 21 are at the level L, while outputs $\overline{Q}$ thereof are at the level H. On account of this, an output of the level H from the "and" gate 22 is applied to an input D of the flip-flop 19 as a data input thereto. At this instance, since one of the inputs of the "and" gate 18, i.e., an output Q from the flip-flop 17 is at the level H, the "and" gate 18 applies a clock pulse which is applied from the output $\overline{Q}$ of the flip-flop 15 to an input CK of the flip-flops 19 to 21. When the first clock pulse is applied to the input CK of the flip-flops 19 to 21, the H level input of the flip-flop 19 is shifted to its output Q.

When the flip-flop 27 receives an H level signal from the output Q of the flip-flop 17, the flip-flop 27 produces an L level signal at the output $\overline{Q}$ thereof. Accordingly, an "or" gate 28 produces an H level signal to turn off an analog switch 29. As the result, the memory capacitor 31 stores a light-metered output at this instance.

The "and" gate 25 produces an H level signal when it is impressed with an H level signal from the "or" gate 24 and an H level signal from the output Q of the flip-flop 19. The switch circuit 26 is turned on when it is impressed with an H level signal from the "and" gate 25 to energize the electromagnet Mg, whereby the stop-down and mirror raising mechanisms are actuated. In this consequence, the memory switch S11 is turned on immediately before exposure so that an L level signal is applied to the other input of the "or" gate 28.

Now, the flip-flops 11 through 15 which have been released from their reset conditions commence frequency-dividing of the output pulses. Since an output Q from the flip-flop 14 corresponds to one half of an output Q from the flip-flop 13, the outputs Q from both flip-flops 14 and 13 assume the level H at the 3/2 cycle of the output Q from the flip-flop 13. At this instance, an output from the "or" gate 24 assumes the level L, and an output from the "and" gate 25 assumes the level L, whereby the switch circuit 26 is turned off and the power supply to the electromagnet Mg is stopped. This is for minimizing the power supply time to the electromagnet Mg, which is required only for releasing the stop-down and mirror raising mechanisms. This power supply time is formed twice during one cycle of the clock pulse. Since no clock pulse is applied to the "and" gate 18 at the second formation of the power supply time, an output from the "and" gate 25 assumes the level L, and the switch circuit 26 remains in its "off" state.

When the second clock pulse is applied to the inputs CK of the flip-flops 19 to 21 through the "and" gate 18, an output Q from the flip-flop 20 assumes the level H, and an output Q from 19 and 21 assume the level L. On account of this, an output from the "and" gate 25 remains at the level L. By the third clock pulse, an output Q from the flip-flop 21 assumes the level H, so that an output from the "and" gate 23 assumes the level H by this clock pulse and an output Q from the flip-flop 21. The flip-flop 17 inverts its state by receiving an H level signal at its input R, whereby an output Q therefrom assumes the level L and an output $\overline{Q}$ therefrom the level H. The flip-flops 11 to 15, 19 to 21, and 27 are reset by receiving the H level signal from the output $\overline{Q}$ of the flip-flop 17 at their respective inputs R.

As the consequence, an output $\overline{Q}$ from the flip-flop 27 assumes the level L. Since, however, the other input of the "or" gate 28 is at the level L, the analog switch 29 is maintained in its "off" state. When the exposure terminates and the memory switch S11 is turned off, the "or" gate 28 produces an output at the level H to turn on the analog switch 29. As the result, the metering circuit 30 and the memory capacitor 31 are coupled and preparation for the subsequent photographic operation is completed.

Because the counting time required for shifting the data input of the flip-flops 19 to 21 is determined by the number of stage of the flip-flop or the cycle of the clock pulse, they may be properly selected in accordance with the counting time. Considering that the shutter speed of the photographic camera in general is variable between a high speed of 1/2,000 sec. and a low speed of 8 sec., for example, this counting time should preferably be one that is capable of changing the state of the flip-flop 17 during a time instant from the manual operation to the commencement of the shutter opening.

In the present embodiment, the one-shot multi-vibrator 16 generates a pulse only for a certain definite time instant while the switch S10 is continuously depressed. Therefore, even when the film winding and the shutter charging operations are completed with depression of the switch S10, for instance, a subsequent photographic operation cannot be effected. For the subsequent photo-taking operation to be done, it is necessary that the switch S10 be turned off and then again turned on.

Figure 3:
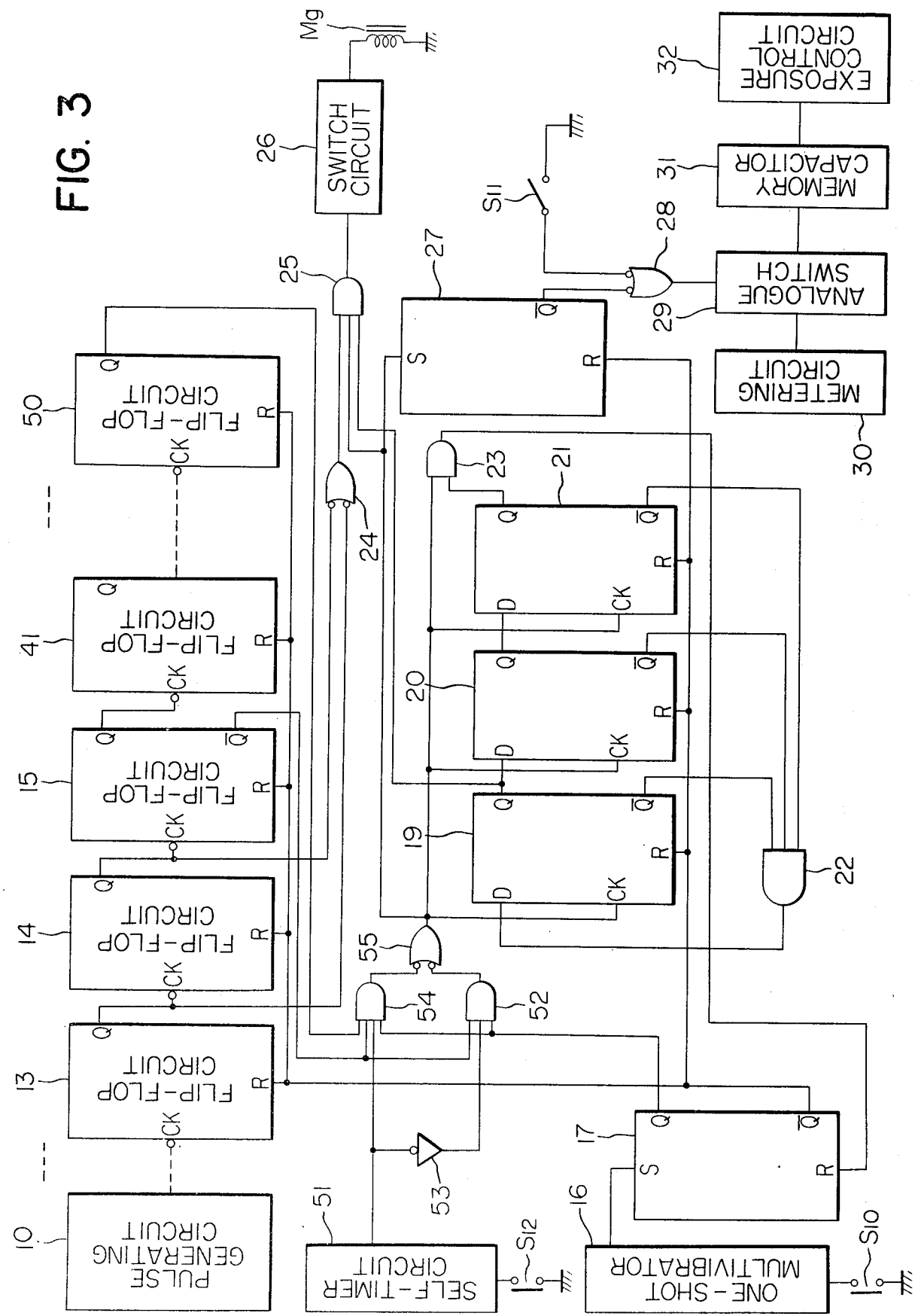
FIG. 3 is another embodiment of a circuit construction for an automatic exposure control device for a camera according to the present invention.

In FIG. 3, flip-flops 41 through 50 follow after the flip-flop 15 for frequency-dividing of an output Q from the flip-flop 15. A self-timer circuit 51 produces an H level signal when a self-timer switch S12 is turned on, and produces an L level signal when the switch is turned off. An "and" gate 52 receives output signals from an input an output Q of the flip-flop 17, an output Q of the flip-flop 15, and an output of an inverter 53 which inverts the output from the self-timer circuit 51. An "and" gate 54 receives output signals from an output Q of the flip-flop 17, output $\overline{Q}$ of the flip-flop 15, the self-timer circuit 51, and an output Q of the flip-flop 50. An "or" gate 55 receives signals from the "and" gates 52 and 54. An output from this "or" gate 55 is applied to one of the inputs of the "and" gate 23 and also to an input S of the flip-flop 27.

For the photographic operation to be effected by the use of the self-timer, the self-timer switch S12 is first turned on, whereby the self-timer circuit 51 applies an H level signal to both inverter 53 and "and" gate 54. The "and" gate 52 which has been impressed with an L level signal from the inverter 53 produces an L level signal. Subsequently, when the switch S10 is turned on, an output Q from the flip-flop 17 assumes the level H, and an output $\overline{Q}$ therefrom assumes the level L with the consequence that the flip-flops 11 to 15, 19 to 21, 27, and 41 to 50 are respectively released from their reset conditions. At this instance, since the outputs Q from the flip-flops 11 to 15, and 41 to 50 are at the level L, the "and" gate 54 which receives a signal from the output Q of the flip-flop 50 produces an L level signal. Therefore, the "or" gate 55 produces an output at the level H, and the flip-flop 27 remains in its reset conditions.

The flip-flops 11 to 15 and 41 to 50 start the frequency-dividing operation when an output $\overline{Q}$ from the flip-flop 17 assumes the level L by the manual operation. As the frequency-diving operation proceeds and an output Q from the flip-flop 50 assumes the level L (a delay time from the manual operation to the output Q from the flip-flop 50 assuming the level H corresponds to the self-timer operating time), the "and" gate 54 permits the clock pulse from the output $\overline{Q}$ of the flip-flop 15 to pass therethrough. The output $\overline{Q}$ from the flip-flop 27 assumes the level L with the first pulse in these clock pulses, and the analog switch 29 is turned off to perform the memory lock, as mentioned in the foregoing. At the same time, the shift registers 19 to 21 start their counting operations. After this, the same operations as mentioned above will be carried out. Incidentally the self-timer switch 12 is turned off upon termination of the exposure.

As mentioned in the foregoing, the automatic exposure control device according to the present invention starts the memory holding of the analog memory element in advance of energization of the electromagnetic member for the electromagnetic release operation of the automatic exposure control mechanism due to the manual operation, so that the analog memory element is not affected by variations in the source voltage due to electric conduction to the electromagnetic member, and an appropriate exposure can therefore be attained.

In this embodiment, the photoelectric output from the photometering circuit A1-7 is memorized in the analog memory element prior to the energization of the electromagnet Mg. This memory in the analog memory element is under control of the control circuit A1-5 until the memory switch is turned on, is shifted under control of the memory switch, when the switch S1 is turned on by the action of the aperture mechanism or the mirror mechanism after the electromagnetic release operation, and the memory is released, when the memory switch is turned off. In this consequence, a time in which the memory is under control of control circuit A1-8 does not need to be varied, depending on a difference in the shutter time.

I claim:

1. A camera comprising:
   (a) a power source;
   (b) a photometering circuit for producing a photoelectric output corresponding to the brightness of an object to be photographed;
   (c) an analog memory element for memorizing the photoelectric output;
   (d) an exposure control circuit for automatically controlling exposure in accordance with the photoelectric output memorized in the analog memory element;
   (e) a manually operable electromagnetic release device including an electromagnet and switch means for supplying power from the power source to the electromagnet following manual operation;
   (f) first memory switch means associated with the electromagnetic release device, the memory switch having a first state in which the photoelectric output of the photometering circuit is memorized in the analog memory element prior to commencement of exposure and a second state in which the memory is released after exposure completion; and
   (g) control means for memorizing the photoelectric output from the photometering circuit in the analog memory element independently of the first memory switch, in response to the manual operation and before initiating power supply to the electromagnet.

2. A camera according to claim 1, wherein the control means includes means for detecting the manual operation, the detecting means producing a first output when it detects the manual operation; second memory switch means having a first state in which the analog memory element memorizes the photoelectric output and a second state in which the memory is released; and a circuit which, when supplied with the first output, renders the second memory switch means in the first state and thereafter actuates said power supply commencing means to allow power supply to the electromagnet.

3. A camera according to claim 2, wherein the control means include a circuit for holding the memory after the second switch means has assumed the first state and at least until the first memory switch means assumes the first state.

4. A camera according to claim 3, wherein the memory holding circuit includes a timing circuit which assumes a first state until a predetermined time has elapsed from the generation of the first output, and means for rendering the analog memory element in the memory state when either one of the timing circuit and the first memory switch means is in the first state.

5. A camera according to claim 1, further comprising a delay circuit which is energized by the manual operation and actuates the control means after a delay time corresponding to the operational time of a self-timer.

* * * * *